United States Patent [19]
Moorehead

[11] Patent Number: 5,451,318
[45] Date of Patent: Sep. 19, 1995

[54] SOLIDS SEPARATOR BOUNDARY LAYER EFFECT FILTRATION SYSTEM

[76] Inventor: Jack Moorehead, 5355 Mira Sorrento Pl., San Diego, Calif. 92121

[21] Appl. No.: 188,092

[22] Filed: Jan. 28, 1994

[51] Int. Cl.⁶ .............................................. B01D 21/26
[52] U.S. Cl. ................................. 210/512.1; 209/710; 209/715; 209/726; 209/727; 209/730; 210/787
[58] Field of Search .................... 210/512.1, 787, 788, 210/188, 97, 106; 209/710, 715, 725, 726, 727, 730; 55/459.1

[56] References Cited

U.S. PATENT DOCUMENTS

| | | | |
|---|---|---|---|
| 4,604,109 | 8/1986 | Koslow | 210/DIG. 5 |
| 5,028,318 | 7/1991 | Aslin | 210/512.1 |
| 5,100,552 | 3/1992 | Carroll | 210/788 |
| 5,269,949 | 12/1993 | Tuszko et al. | 210/512.1 |

*Primary Examiner*—Robert A. Dawson
*Assistant Examiner*—David Reifsnyder
*Attorney, Agent, or Firm*—John R. Duncan; Frank D. Gilliam

[57] ABSTRACT

A filtration system for water or other selected liquids that includes an ozone mixing station, a primary solids and gas separator and, if desired, a second vortex particle separator and filter system. The ozone mixing station includes a high efficiency ozone generator and a channel arrangement, such as a spiral tubular treatment coil, through which the ozone/liquid mixture passes to assure thorough mixing and provide time for effective treatment. The primary solids separator includes an offset inlet jet through which the liquid from the ozone treatment station is injected into a first circular chamber. The resulting rotating liquid vortex moves to a narrowed co-axial second circular chamber to cause heavy particles to concentrate at the outer perimeter then to a coaxial larger third circular chamber. The liquid exits through an annular outlet located around the chamber axis to prevent buoyant particles in the axial region and heavy particles at the outer periphery from passing out with the liquid. Gas collects in a cylindrical axial region with the lighter suspended particles in an annular region around the gas column. The gas phase is removed through an annular, variable, series of holes at the top of the chamber. The liquid from the solids separator may be passed to a filter system to further treat the liquid.

11 Claims, 2 Drawing Sheets

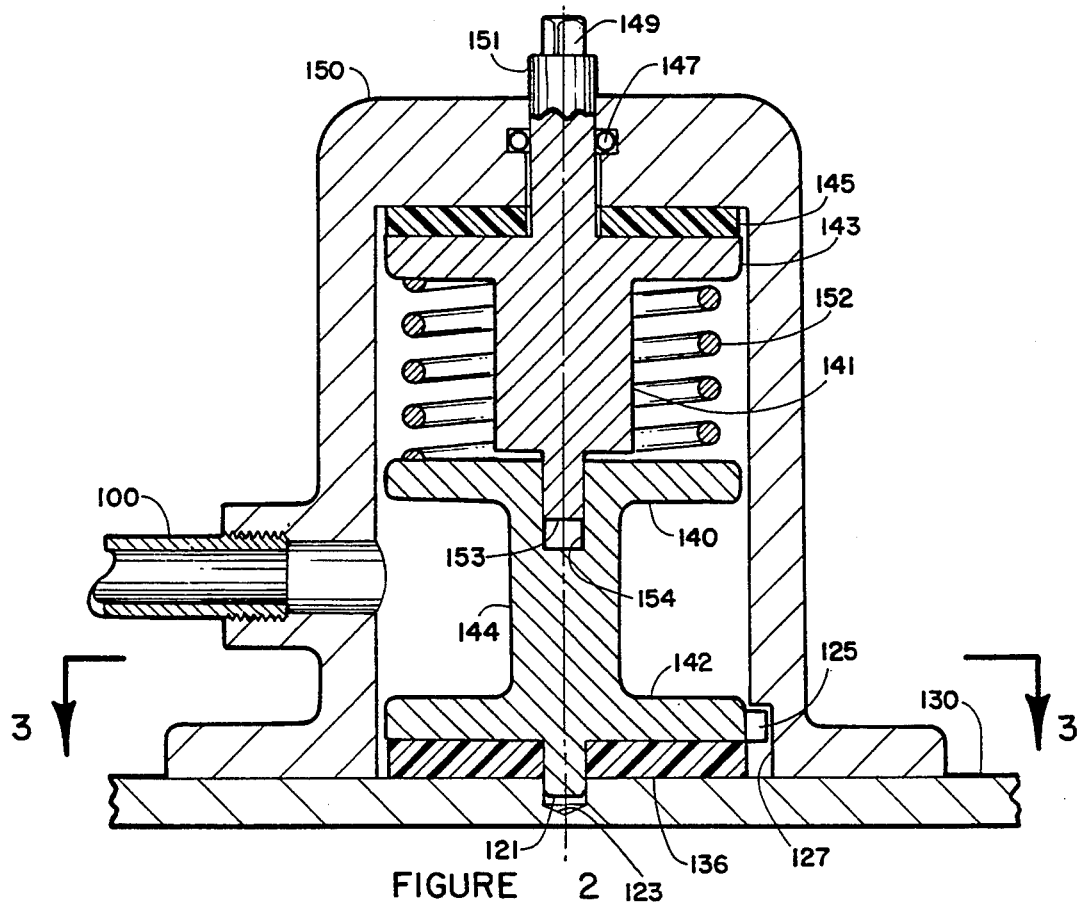
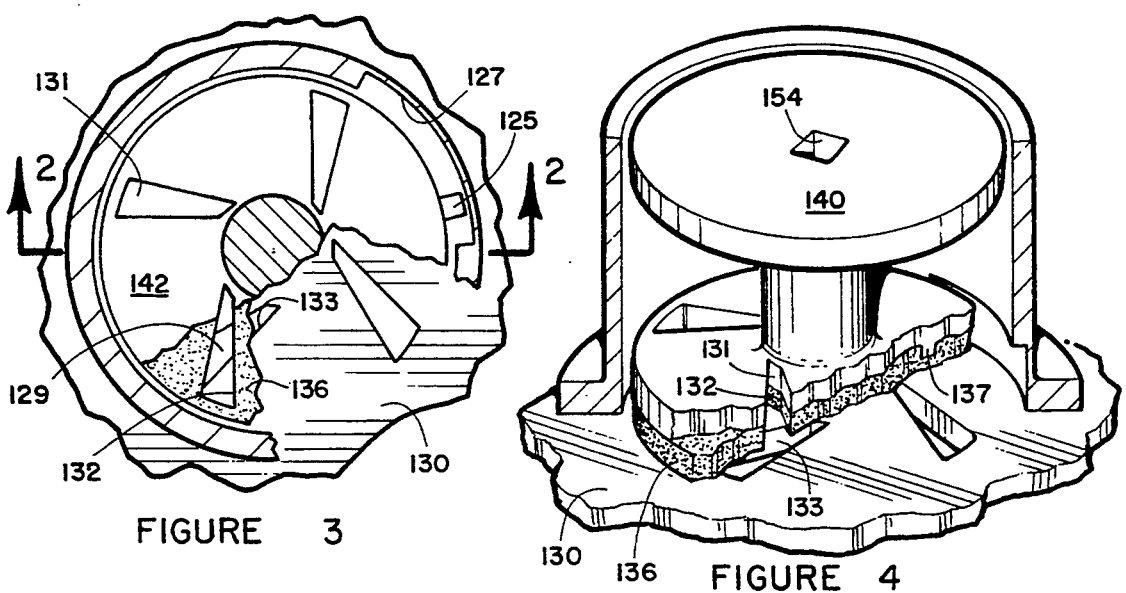
FIGURE 2
FIGURE 3
FIGURE 4

1

SOLIDS SEPARATOR BOUNDARY LAYER EFFECT FILTRATION SYSTEM

BACKGROUND OF THE INVENTION

This invention relates in general to systems for removing contaminants from liquids and, more specifically to a system for removing particles, both heavy and light or buoyant particles from a liquid.

Water supplies for domestic drinking water, process water for chemical plants or other liquids are often contaminated with both heavy and light, buoyant, particles. These particles must be removed in a reliable, cost effective manner.

Many older water treatment plants use dual-media sand filtration systems that may not be acceptable under the newer water quality standards. In some cases, these systems can meet the standards through the use of properly mixed polymer chemical filter aids. The required expensive and complex polymer chemical mixing equipment requires constant attention, since the amount of the chemicals being added to raw water must be frequently readjusted to match the continually changing chemistry of the water being filtered. Slow sand filters require a considerable investment, but generally can be operate for longer periods without cleaning. Unfortunately, even with pre-treatment, both dual-media and slow sand filters fail to meet water quality standards for hours or several days after each backwash cleaning. Contaminates have been found to pass through a sand filter whenever water flow rates are changed and whenever the pump is stopped and turned on again. In order to meet standards, it may be necessary to pump filtered water to waste after every backwash cycle, disposing of thousands of gallons of water, until the filter "ripens" or compacts. Thus, these filter systems are less than desirable for use today.

Most conventional manually-cleaned filtration systems are oversized to extend the amount of time between cleanings. Since cleaning takes considerable time and may result in the problems described above, a lengthy time between cleanings has been considered highly desirable. Measuring differential pressure across the filter will indicate when the entire filter is clogged and in need of cleaning. This increase in differential pressure only occurs near the end of the filter run, giving little advance warning. Thus, there is a need for automatic self-cleaning filtration systems designed to automatically stop and run a backwashing cycle without inconveniencing the owner or operator. This will permit use of smaller, more optimum, filter sizes, where the decrease in differential pressure across the filter media begins immediately and gradually increases to the point where cleaning is necessary. This gradual increase in differential pressure would also allow the operator to calculate the exact volume of liquid flowing through the system and correlate flow volume to differential pressure, so that differential pressure readings can be used thereafter as a simple means of indicating flow rates.

Ozone and oxygen are sometimes mixed with water or other liquids to eliminate contaminants, in particular bacterial contaminants. In conventional ozone contact chambers, the ozone gas is applied at the base of a tall column. The ozone-oxygen bubbles float to the surface slowly, their upward movement slowed by the downward counter flow of the water stream. To achieve sufficient contact time before the water passes from the mixing column, the column must be extremely tall and is difficult to install in ordinary sized plant equipment rooms. The concentration of dissolved ozone-oxygen is undesirably diluted in the larger vertical columns. While ozone-oxygen contact in mixing chambers is generally effective, there is a need for improved mixing in smaller mixing vessels.

Cyclone separators are often used to separate heavy particulate material from liquids such as water. Typical of such cyclone systems is that described by Laval in U.S. Pat. No. 3,568,837. In such separators, a fluid stream is directed at high velocity into a cylindrical tank at an angle that cause the fluid to rotate at high speed, driving entrained particles to the wall from which the particles move downward into a conical tank bottom with a central valve for removing the collected particles. The liquid is removed from the center top of the tank. However, conventional cyclone suspended solids separators only remove heavy particles, with any entrained gases and light or buoyant particles remaining in the exiting fluid stream.

Thus, there is a continuing need for a separation system that can mix the liquid with ozone in a more effective manner, can separate entrained gases and light or buoyant particles from the liquid in addition to heavy particles and can post treat the liquid with further vortex separation and micron size particle separation and filtration if needed.

SUMMARY OF THE INVENTION

The above noted problems, and others, are overcome by a four stage filtration system incorporating an ozone-oxygen contact-mixing chamber, a primary combination separator for separating heavy and buoyant solid particles and entrained gases, a second stage vortex separator and a high efficiency boundary layer filter station.

The liquid is initially mixed with ozone produced by a high efficiency generator. The ozone-oxygen contact and mixing chamber incorporates a venturi mixer or inductor port to inject ozone and oxygen (or, if desired, air in place of oxygen) into a fluid stream of water or other suitable liquid by venturi suction or high pressure injection. The water being treated then passes through a selected geometric configuration that channels the flow of liquid to produce high velocity (resulting in turbulent or laminar flow) through a narrow channel. In a preferred configuration, the liquid is directed through an extended length of tubing coiled inside a larger outer housing. The length of tubing is selected to provide sufficient time for the dissolved ozone and oxygen to partially oxidize organic particles suspended in the liquid, typically water, being treated. Other inorganic suspended particles may be physically altered by exposure to the dissolved ozone and oxygen, causing them to flocculate or form larger particle clusters. Typically, the tubing may have an inside diameter of from about 1 to about 4 inches and a length of about 10 to 300 feet.

The primary solids separator is made up of three circular chambers arranged in series about a vertical axis. The liquid is injected through an offset inlet jet into the top of a first, upper, chamber to form a rapidly rotating liquid vortex. The velocity of the liquid vortex is controlled by the selected size and shape of the inlet port, which may be variable if desired. The second or center chamber has a smaller diameter than the first chamber to increase the rotational velocity of the liquid to force heavy particles to the outer perimeter of the chamber by centrifugal force, then downwardly along the outer wall by gravity. These heavy particles migrate downwardly into a third, lower, chamber that has a diameter greater than the second chamber. They collect in a sump region at the bottom of the third chamber until drawn off through a valve to a waste line.

The vortex in the third, lower, chamber is made up of three components, the outermost liquid region containing the particles migrating down the wall to the sump, inward of which is a clean water region, substantially free of heavy particles. At the center of the vortex, along the chamber axis, is a gas containing region surrounded by an annular region of liquid carrying buoyant particles. An annular intake port is positioned in the lower chamber with the annular intake in the clean liquid region between heavy particles and the central gas and buoyant particle region.

The undissolved ozone-oxygen bubbles inducted into the ozone contact chamber, being lighter than the liquid, are forced into the center of the vortex, carrying lighter suspended particles into the vortex center. A gas relief valve is provided at the top of the first chamber on the system axis. Also, a separate valve is provided to draw off the central liquid region that contains buoyant particles. When excess gas is vented, an automatic air relief valve opens to expel gas only. The separate (liquid) valve is connected to a waste line and allows a controlled flow of buoyant particle liquid to be drawn off and discharged into the waste line. When this liquid valve is opened, the gases and lightest, buoyant, particles around the center of the vortex are drawn off. Since it is desirable to have a stable gas region at the vortex center, a variable disk arrangement having a series of annular holes is positioned at the top of the gas column, so that when the gas region becomes large enough to extend past the ring of holes the gases are drawn off, leaving the desired gas region diameter.

For optimum results, the center vortex outlet disk with peripheral holes is formed from two disks having oppositely angled overlapping slots which combine to form rounded holes. As one disk is rotated slightly relative to the other, the circle of rounded holes is moved toward or away from the system axis. This permits the diameter of the central gas vortex to be varied, either manually or automatically in response to system sensors.

where further cleaning of the liquid is desired, the clean liquid from the primary solids separator can be routed to at least one of a plurality of parallel filter stations, of the sort detailed in my copending U.S. patent application Ser. No. 08/047,823, filed Apr. 15, 1993 now U.S. Pat. No. 5,401,397. At each of these stations, a vortex chamber separates remaining heavy particles and a high efficiency filter removes very small particles. When a filter station reaches capacity, a sensor switches flow to another filter station and the clogged filter is automatically backflushed. If desired, additional post-treatment may be provided, such as the addition of chlorine or filtering through a carbon filter to remove organic liquid contaminants, etc.

BRIEF DESCRIPTION OF THE DRAWING

Details of the invention, and of preferred embodiments thereof, will be further understood upon reference to the drawing, wherein:

FIGS. 2 is an annular section view of the variable annular gas vent disk assembly;

FIG. 3 is a section view taken on line 3—3 in FIG. 2; and

FIG. 4 is a perspective view, partially cut-away, of the lower portion of gas vent disk assembly.

DETAILED DESCRIPTION OF PREFERRED EMBODIMENTS

Figure 1:
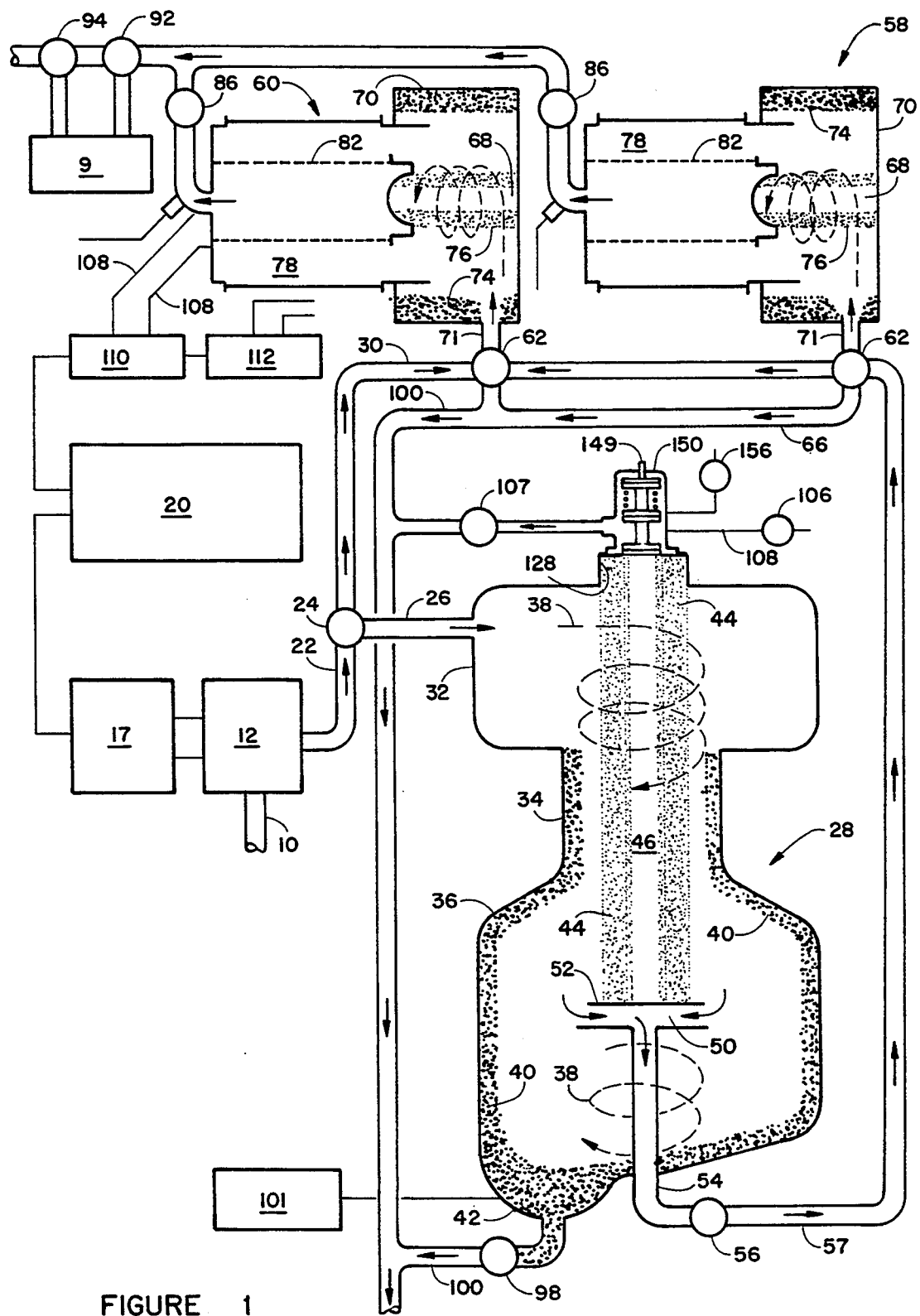
FIG. 1 is a schematic flow diagram of the solids separation system of this invention.

Referring to FIG. 1, there is seen a schematic representation of the system for removing both heavy and light or buoyant particles and entrained gases from a liquid stream, such as water from a well, river, or the like.

The liquid to be treated enters through an influent line 10. Any suitable liquid may be treated in this system. Typically drinking water from a well, stream or other source, process water for chemical processes (which, in some cases must have a purity higher than that required for drinking water) or other liquids such as beverages like milk, wine, etc. may be treated. Other applications include secondary and tertiary treatment of sewage, water reclamation, etc.

The liquid initially passes through a ozone/oxygen contactor mixing assembly 12. The liquid enters through a venturi mixer, inductor port or other suitable means. The liquid passes through a suitable geometric configuration that channels the flow of liquid and traps the gas phase to carried in the direction of flow for the effective contact distance. The channels ideally provide a long, narrow, path so that the liquid travels at high velocity for more efficient mixing. A preferred mixer uses an extended length of tubing 14 coiled inside a larger outer housing 16. Any suitable FDA approved metal, plastic, glass or other tubing material may be used.

Ozone is produced by passing oxygen through the space between two electrodes which conduct high voltage current in ozone generator 17. A dielectric insulating material causes a breakdown of the current in the space between an inner electrode and an outer electrode. This breakdown of the current between the electrodes produces a corona electron field of high energy. As oxygen passes through this corona field, oxygen molecules attract addition electrons, causing the oxygen molecules to disassociate and form separate oxygen atoms. Some of these free oxygen atoms will recombine to form ozone; three oxygen atoms with three electrons. Ozone is effective as a filter aid to partially oxidize organic particles suspended in the liquid being treated and to prevent the formation of scale that could clog the filter media. Dissolved ozone also forms an oxide coating on the surface of submerged metals, preventing corrosion. An ozone molecule is a rapid oxidizer that will reduce organic molecules quickly. Partially oxidized organic particles gain electrons and assume a positive attraction for other negatively charged particles, causing them to amalgamate, forming larger clumps easily removed by a filter. However, an excess amount of ozone in the liquid stream can cause organic particles to completely dissolve, and thereby pass though a filter element, which is undesirable. By monitoring the differential pressure across a filter element and adjusting the ozone output of an ozone generator, the filtering efficiency of the system can be optimized, manually or automatically under computer control.

Conventional electrodes used in corona-discharge ozone generators use a solid conductive material to form and inner electrode spaced from an outer electrode. To avoid excessive resistance heating, the electrode sizes must be increased for high current applications. I have found that improved performance can be obtained by using a perforated or grill like outer electrode, with a fan or the like to blow cooling air over the electrodes. The inner electrode is preferably is a quartz-glass vacuum tube containing a gas vapor which acts as the conductor-electrode, with the quartz glass wall of the vacuum tube acting as the dielectric insulator. The conductive vapor molecules inside the vacuum tube form a "bridge" which conducts high voltage current over the entire interior surface of the inner electrode, providing a much large surface area than the surface area which is normally available on a continuous solid conductor tube or flat-plate surface used as an inner electrode in conventional corona-discharge generators.

A motorized veriac transformer may be used to adjust the current to the high-voltage transformer supplying the ozone generator so that the amount of ozone produced may be increased or decreased. The veriac transformer may be manually adjusted or automatically controlled by controller 20

The liquid containing a mixture of ozone and oxygen (the oxygen may be in the form of substantially pure oxygen, air or other suitable mixture of gases that includes oxygen) then passes through line 22 to valve 24, which selectively directs the liquid stream in to inlet line 26 of solids separator 28 or to by-pass line 30, described below.

Solids separator 28 includes three vertically arranged, coaxial, circular chambers; namely first chamber 32, second chamber 34 and third chamber 36. Inlet line 26 injects liquid into first chamber 32 at sufficiently high velocity and at an angle to the chamber centerline such that a rapidly rotating liquid vortex is established, rotating as indicated by arrow 38.

The rotating vortex moves downwardly into second chamber 34 that has a diameter less than that of first chamber 32 so that the velocity of the vortex increases, centrifugal forces drive heavy particles 40 in the liquid outwardly against the wall of chamber 34. For best results, the ratio of the diameter of first chamber 32 to the diameter of second chamber 34 is from about 2:1 to 3:1. Under the force of gravity, particles migrate downwardly along the wall into third chamber 36, finally accumulating in sump 42 in the bottom of third chamber 36.

The undissolved ozone-oxygen bubbles in the liquid (being lighter than the liquid), draw the lighter, buoyant particles 44 in the liquid into the vortex center which remain suspended in liquid there until removed. A column of gas 46 exists at the very center of the separator 28 with the annular, tube-like, light particle rich region surrounding the gas. If desired, in order to increase the effect of gas bubbles carrying buoyant particles to the annular region adjacent to the gas column, additional gas bubbles may be injected into the air stream in line 22 or inlet line 26.

An annular region of mainly particle-free liquid remains between the heavy particle outer region 40 and the inner light particle rich region 44. This relatively clean liquid is drawn off through an annular opening 50. If desired the annular opening 50 may open downwardly toward the bottom of chamber 38. The flat or concave upper surface 52 provides a lower limiting face for the center vortex including light particle rich region 44.

The relatively particle-free liquid passes out of chamber 36 through line 54, through an on-or-off valve 56, to one of several (in the embodiment shown, two) parallel secondary filtration stations 58 and 60 through line 57. In normal operation, both stations will be in use until one becomes clogged, at which time one of stations 58 and 60 will be in use and the other will be in the shut down or backflush mode, as described below. Two three-way valves 62 and 64 re operated to selectively connect line 57 or line 30 to either of the secondary filter stations, or connect one of stations 58 and 60 to a waste line 66. If it is found that the raw liquid entering through input line 10 is sufficiently free of particles (or during cleaning of solids separator 28), valve 24 may be operated to send liquid from line 22 through line 30 and one of valves 62 to one of filter stations 58 and 60.

Stations 58 and 60 each include a circular chamber 70 in which liquid entering through an offset inlet port 71 causes a vortex to form, driving any heavy particles to a peripheral heavy particle collection zone 74. At the same time air bubbles and any other gas are forced into the center of the vortex, forming a gas-phase cylinder 68. Particles entrained by the gas bubbles and carried to the center of the vortex will be trapped in an annular liquid zone 76 adjacent to gas cylinder 68. Water to be filtered is thus drawn from the annulus area between the light particle region 76 and the heavy particle region 74.

The liquid then passes into a chamber 78 which includes a tubular high efficiency filter 82. The rotating motion of the liquid vortex is continued over the entire length of the exterior of the filter 82 inside chamber 78. This rotating liquid creates a scrubbing action tangentially across the surface to the filter media, forcing larger particles trapped on the filter surface to be pushed along in the direction of the flow of the rotating water, thus clearing openings in the filter media surface previously clogged by the particle just pushed aside. This boundary layer effect (the frictional drag of water molecules rubbing across the filter surface) causes a "cleaning" action and extends the time before the filter "blinds" over, clogged with small particles which were suspended in the liquid drawn from the annulus portion of vortex chamber 70.

The affluent then passes through a valve 86 to affluent line 90. The affluent from line may be given any desired post-treatment that might be desired, such as by directing the affluent through valve 92, treatment station 94 and valve 96. Typical such treatments might include the addition of chlorine, buffering the liquid, passing the liquid through a suitable carbon filter to remove liquid organic contaminants, etc.

Solids separator is cleaned by opening sump valve 98 to drain heavy particles 40 and associated water to a waste line 100 and removing light particles 44 and water through a valve 107 and waste line 100. Ordinary system pressure is sufficient to force heavy suspended particles collected in sump 42 out and into waste line 100. A manual or automatic flow regulator may adjust valve 98 to allow a controlled amount of fluid to be discharged into waste line 100 to gradually discharge heavy particles collecting in the sump 42.

In order to maintain the gas column 46 at a desired diameter, an assembly having an annular ring of holes is interposed between outlet valve 107 and the first chamber 32. A particularly desirable variable hole arrangement is shown in FIGS. 2–4 and discussed below. Excess air accumulated in axial region 46 can be removed through air relief valve. Ozone can be directed to a carbon filter to remove excess ozone, if desired.

The entire solids separator 28 is easily cleaned by emptying all of the liquid out through the valve 98. This is accomplished by closing affluent valve 56, simultaneously closing valve 24, opening valve 98 and opening the solenoid or manual valve 106 on high pressure air line 108. This will force, by gravity and air pressure all of the liquid held inside solids separator 28 out through valve 98 into waste line 100.

If desired, the depth and/or the density of the large particle mass collected in sump 42 may be monitored with an ultrasonic sensor or level gauge 101 or by monitoring the affluent water discharged from the solid separator. The turgidity level, total-dissolved-solids level, particle count and sizes, or sudden increase in the rate of differential pressure rise (taken together, a "sensor group") may separately, or in any combination, be used to monitor the volume of contaminants collected by the solids separator or overflowing into the product liquid. Sensor 101 may include an alarm to be transmitted, or activation of automatic purging of the lower chamber, if excessive heavy particles are sensed in sump 42. Three way valve 24 will prevent water hammer if the solids separator 28 is automatically cleaned during operation of the system.

Digital pressure transducers 110 and 112 measure the relative pressure on both sides of filter elements 82. Transducer 110 is connected to secondary filter assembly 60 as shown;, with transducer 112 connected to filter assembly 58 in the same manner, with the connections omitted for clarity. Wires 108 connect to conventional pressure sensors in ports on opposite sides of filter element 82. The differential pressure is monitored, manually by observing a gauge or by computer controller 20. When the gauge indicates a clogged condition, or controller 20 determines that clogging has occurred, or differential pressure reaches a predetermined point, a cleaning sequence is begun. To backflush or clean the filter station, valve 86 is closed and three-way valve 62, through which liquid is flowing from the influent line 30 into vortex chamber 70, is activated, reversing the direction of liquid flow into waste line 100, causing liquid to now flow from vortex chamber 70 into waste line 100. A solenoid valve 120 on air line 116 is opened and the liquid inside filter element 82 is forced back through the filter media, out of filter chamber 78, through vortex chamber 70, out through valve 62 and into waste line 100. While one filter element cleans itself the other filter element accepts the entire liquid flow of the system. If the valves on both of the filter systems were to close at the same time, damaging water hammer could occur.

The solids separator and boundary layer effect filtration system is particularly suited to automatic control, using appropriate sensors to measure operating parameters and operate flow controls, cleaning sequences, etc. as needed.

The arrangement of the components in the preferred variable outlet hole assembly is seen in FIGS. 2–4. The assembly is positioned within a dome 150 at the top center of upper chamber 32 which is secured to the upper wall 130 of chamber 32 which includes a central area having a plurality of elongated slots 133 equally spaced around a selected circle. Slots 133 are all identical and are each positioned at the same angle to a line drawn from the center of the circle to an end of a slot.

A disk 136 of tough, rubbery, material such as polyurethane, neoprene or the like having a pattern of slots 132 that is the mirror image of slots 133 is positioned in contact with the upper surface 130 concentric with the circle of slots 133.

A spool piece 144 is positioned in contact with flexible disk 136. The lower flange 142 has a pattern of slots 131 (as seen in FIGS. 3 and 4 identical with slots 132 in flexible disk 136. A plurality of pins 137 on the lower surface of flange 142 fit into corresponding recesses in the upper surface of flexible disk 136 to lock the two for rotation together.

Lower flange includes a pin 121 extending into a bearing recess 123 to guide spool 144 during rotation between selected positions. A tab 125 at the edge of lower flange 142 extends into a slot 127 in dome 150 having a predetermined length to limit rotation of spool 144.

Spool 144 further includes an upper flange 140 having a square recess 154 centrally located in its upper surface.

An extension piece 141 includes a square projection 153 sized to slidably fit in recess 154 and a flange 143. A flexible sealing washer 145 is positioned between flange 143 and the inside upper surface of dome 150. A compression spring 152 between extension flange 143 and spool upper flange 140 biases them apart, maintaining a good seal between flexible disk 136 and the upper surface of wall 130 and between flexible washer 145 and the inner top surface of dome 150. A shaft 151 extends from flange 143 through an opening in the top of dome 150 and carries an axial square projection 149. A suitable wrench or motor drive (not shown) may be connected to projection 149 to rotate extension 141, spool 144 and flexible disk 136 as a unit.

Thus, as flexible disk 136 is rotated relative to upper wall 130, the overlapping, oppositely angled, slots 132 and 133 will form openings 129 (as seen in FIG. 3) where the slots cross that "move" inwardly or outwardly. Thus the radius of the ring of holes can be easily adjusted by rotating flexible disk 136. while a pattern of four slots as shown give excellent results, more or fewer slots may be used where suitable. The length and radial positioning of the slots will be determined in accordance with the range of hole ring sizes desired.

In operation, as more gas accumulates in the central column 46, as seen in FIG. 1, the diameter of the column will expand until gas can pass though the ring of holes 129 to a gas vent 156. The diameter of the column thus can be adjusted by rotating spool 144 and flexible disk 136 relative to surface 130 to change the hole ring diameter.

The buoyant particles in annular region 44 can be vented to waste line 100 by opening valve 107, allowing liquid carrying the buoyant particles to exit through holes 129. This can be accomplished manually or by a mechanical drive under the direction of computer controller 20 in response to signals from conventional sensors sensing the density or extent of buoyant particle region 44.

while certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A solids separation system for removing heavy particles and light, buoyant, particles from a liquid stream which comprises:

communicating first, second and third coaxial circular chambers liquid injection means for injecting liquid into said first chamber to form a rapidly rotating liquid vortex in said chamber;

said second chamber being adjacent to said first chamber and having a smaller diameter than said first chamber, for receiving said liquid vortex from said first chamber, whereby the vortex velocity is increased and heavy solid particles in said liquid are forced to the chamber periphery and migrate along said periphery, gases are forced to a columnar region along the axis of said chambers and light particles are concentrated in an annular light particle rich region surrounding said gas column;

said third chamber being adjacent to said second chamber and having a larger diameter than said second chamber for receiving said liquid vortex from said second chamber;

a sump in said third chamber for receiving said heavy solid particles;

means for removing said solid particles from said third chamber;

means for maintaining a central gas column of selected diameter;

means for removing light, buoyant, particles from said annular light particle rich region surrounding said gas column; and an annular outlet means coaxial with said third chamber and spaced from the axis of said third chamber for removing clean liquid from said third chamber.

2. The system according to claim 1 including means for confining said axial gas column and annular buoyant particle rich region between the top of said first chamber and a plate normal to the chamber axis in said third chamber.

3. The system according to claim 1 wherein a disk means having an annular ring of holes bounds the upper end of said axial gas column and a gas venting means receives gas passing through said holes, whereby gas is vented when the diameter of the gas column exceeds the inner diameter of said hole ring.

4. The system according to claim 3 further including means for varying the diameter of said ring of holes to establish the diameter of said gas column.

5. The system according to claim 3 wherein a discharge valve is operatively connected to receive liquid from said buoyant particle rich annular region through said annular ring of holes when said valve is opened.

6. The system according to claim 3 wherein said disk means comprises two juxtaposed disks, one disk including an annular ring of slots, each slot lying at the same angle to a line drawn from the disk center through one end of the slot with the slot ring in the second ring being a substantial mirror image of the slot ring in said first disk, whereby a hole exists at each slot crossing point and as one disk is rotated relative to the other, the diameter of the hole ring is varied.

7. The system according to claim 6 further including means for sensing the quantity of solid particles in said sump and opening said waste valve when said quantity reaches a predetermined level.

8. The system according to claim 6 further including means for cleaning said solids separator including means for closing inlets and outlets to said solid separator, opening said waste valve and for admitting high pressure air to force all liquid and other material out of said solids separator.

9. The system according to claim 1 further including a waste valve at said sump for draining heavy particles collected at said sump.

10. Apparatus for maintaining a central gas column at a selected diameter and for removing liquid adjacent to said gas column in a solid particle separation apparatus in which a vortex is maintained in a vortex chamber to cause heavy particles to move to the periphery of the apparatus, gases to form a generally cylindrical column at the center of the apparatus and buoyant particles to form a buoyant particle rich annular region around said gas column, which comprises:

two juxtaposed disks interposed between one end of said gas column and a gas venting means;

each of said disks including an annular ring of slots, each slot lying at an angle to a line drawn from the disk center through one end of the slot with the slot ring on the second ring being a substantial mirror image of the slot ring in said first disk; and means for rotating one disk relative to the other so that a ring of holes are formed, one hole occurring at each disk slot crossing point;

whereby gas can exit through said holes to said gas venting means when the diameter of the gas column equals or exceeds the inner diameter of said ring of holes.

11. The apparatus according to claim 10 further including a liquid discharge valve located on the opposite side of said disk assembly from said vortex chamber whereby opening said valve will permit liquid from said buoyant particle rich region to pass through said holes and said discharge value from said vortex chamber.

* * * * *